United States Patent [19]

Huang et al.

[11] Patent Number: 4,992,398

[45] Date of Patent: Feb. 12, 1991

[54] HIGH FREQUENCY DIELECTRIC COMPOSITION

[75] Inventors: Rong-Fong Huang; Dean Anderson, both of Alburquerque, N. Mex.

[73] Assignee: Motorola, Inc., Schaumburg, Ill.

[21] Appl. No.: 458,911

[22] Filed: Dec. 29, 1989

[51] Int. Cl.$^5$ .............................................. C04B 35/46
[52] U.S. Cl. ...................................... 501/135; 501/134
[58] Field of Search ........................ 501/134, 135, 136

[56] References Cited
FOREIGN PATENT DOCUMENTS 835859  3/1970  Canada .
79041700 12/1979  Japan .

Primary Examiner—William R. Dixon, Jr.
Assistant Examiner—Chris Gallo
Attorney, Agent, or Firm—Darleen J. Stockley

[57] ABSTRACT

A high-frequency dielectric ceramic compound having a perovskite-type crystal structure comprising a chemical composition substantially represented by the formula $(Sr_xCa_yMn_z)TiO_3$ in which $0.98 < x+y+z < 1.02$, $0.34 < y < 0.4$, and $0.0075 < z < 0.015$, and possessing a non-linear temperature coefficient is set forth. A method is presented for utilizing the compound to formulate a high-frequency dielectric material, the formulated material being particularly suitable for providing filters and related applications with a relatively low resonant frequency temperature coefficient.

4 Claims, 2 Drawing Sheets

| FREQUENCY (MHz) | TEMPERATURE (°C) | INCREMENTAL $T_f$ (PPM) | PERCENT OF FREQUENCY SHIFT $\frac{FREQ(T)-FREQ(25°C)}{FREQ(25°C)} \times 100$ | | DIELECTRIC CONSTANT $E_r$ |
|---|---|---|---|---|---|
| 357.32 | +68.9 | +0.0 | +.5 | | 243.5 |
| 356.11 | +65.7 | +1070.4 | +.2 | | 245.2 |
| 354.53 | +61.6 | +1092.4 | -.3 | | 247.4 |
| 352.94 | +57.5 | +1099.1 | -.7 | | 249.6 |
| 351.34 | +53.0 | +1001.5 | -1.2 | | 251.9 |
| 349.92 | +48.4 | +885.1 | -1.6 | | 253.9 |
| 348.94 | +43.8 | +607.2 | -1.9 | | 255.4 |
| 349.40 | +37.7 | -213.7 | -1.8 | | 254.7 |
| 352.50 | +32.7 | -1773.1 | -.9 | | 250.2 |
| 355.56 | +27.5 | -1652.0 | -0.0 | | 246.0 |
| 355.57 | +22.6 | -4.0 | +0.0 | COOLING | 245.9 |
| 354.85 | +17.5 | +396.3 | -.2 | | 246.9 |
| 353.69 | +11.4 | +534.9 | -.5 | | 248.6 |
| 352.71 | +6.6 | +580.3 | -.8 | | 249.9 |
| 351.67 | +1.4 | +576.8 | -1.1 | | 251.4 |
| 350.39 | -4.5 | +613.0 | -1.5 | | 253.3 |
| 349.33 | -9.5 | +604.1 | -1.8 | | 254.8 |
| 348.32 | -14.6 | +575.7 | -2.1 | | 256.3 |
| 347.10 | -21.1 | +541.1 | -2.4 | | 258.1 |
| 346.04 | -27.2 | +503.9 | -2.8 | | 259.7 |
| 345.11 | -32.4 | +518.4 | -3.0 | | 261.1 |
| 344.07 | -38.7 | +476.6 | -3.3 | | 262.7 |
| 344.12 | -38.1 | +0.0 | -3.7 | | 262.6 |
| 345.12 | -32.2 | +489.9 | -3.4 | | 261.1 |
| 346.03 | -27.1 | +520.4 | -3.1 | | 259.7 |
| 347.05 | -21.6 | +534.8 | -2.8 | | 258.2 |
| 348.26 | -15.0 | +528.8 | -2.5 | | 256.4 |
| 349.26 | -10.1 | +574.5 | -2.2 | | 254.9 |
| 350.12 | -5.9 | +582.2 | -1.9 | | 253.7 |
| 351.33 | +.1 | +582.0 | -1.6 | | 251.9 |
| 352.59 | +5.4 | +666.8 | -1.2 | | 250.1 |
| 353.69 | +10.4 | +630.4 | -.9 | | 248.6 |
| 354.92 | +15.8 | +646.2 | -.5 | HEATING | 246.8 |
| 355.96 | +20.9 | +568.5 | -.2 | | 245.4 |
| 356.81 | +25.3 | +541.6 | +0.0 | | 244.2 |
| 357.44 | +29.2 | +451.9 | +.2 | | 243.4 |
| 357.67 | +33.3 | +154.4 | +.2 | | 243.1 |
| 355.16 | +39.0 | -1256.0 | -.5 | | 246.5 |
| 352.18 | +44.2 | -1627.1 | -1.3 | | 250.7 |
| 351.50 | +48.9 | -407.4 | -1.5 | | 251.7 |
| 352.21 | +54.1 | +389.1 | -1.3 | | 250.6 |
| 353.65 | +59.0 | +828.8 | -.9 | | 248.6 |
| 355.10 | +63.2 | +983.9 | -.5 | | 246.6 |
| 356.88 | +67.7 | +1090.7 | +0.0 | | 244.1 |

*FIG.1*

HIGH FREQUENCY DIELECTRIC COMPOSITION

FIELD OF THE INVENTION

This invention relates to a dielectric ceramic composition and a method for manufacturing high-frequency dielectric materials, and more particularly to a dielectric ceramic compound of a perovskite-type crystal structure possessing a non-linear temperature coefficient and a method for manufacturing high-frequency dielectric materials with non-linear temperature coefficients.

BACKGROUND OF THE INVENTION

Generally, high frequency dielectric materials for filters and resonators require a relatively high dielectric constant ($E_r$), a high unloaded dielectric Q, and a low absolute value of a resonant frequency temperature coefficient ($T_f$). Currently, most widely used, commercially available dielectric materials such as $Ba_2Ti_9O_{20}$ and $BaNd_2Ti_5O_{14}$ exhibit $E_r$ values of approximately 37 and 78, respectively, Q values of 15000 and 8000, respectively, and $T_f$ values of 8 ppm/°C. and 40 ppm/°C., respectively. A need exists for smaller filters and resonators, thereby requiring dielectric materials with a higher $E_r$ that simultaneously maintains a relatively low $T_f$.

SUMMARY OF THE INVENTION

These needs and others are substantially met by the present invention, that provides a perovskite-type crystal dielectric ceramic substantially having a $(Sr_xCa_yMn_z)TiO_3$ composition and a method for preparing a perovskite-type crystal dielectric ceramic to selectively obtain a formulation consisting essentially of $(1-m)[(Sr_xCa_yMn_z)TiO_3]+m$ $CaTiSiO_5$ and having a relatively high dielectric constant together with a relatively low non-linear temperature coefficient, wherein x, y, z, and m satisfy the following relationships:
$0.98 < x+y+z < 1.02, 0.34 < y < 0.4, 0.0075 < Z < 0.015$, and $0.005 < m < 0.015$.

BRIEF DESCRIPTION OF THE DRAWINGS

FIG. 1 is a table setting forth computations and measurements of the dielectric constant ($E_r$), percent frequency shift, and incremental $T_f$ values for the dielectric ceramic of the present invention.

DETAILED DESCRIPTION OF THE INVENTION

The dielectric ceramic of the present invention is characterized in that it comprises a solid solution of $(Sr_xCa_yMn_z)TiO_3$ wherein $0.98 < x+y+z < 1.02, 0.34 < y < 0.4$, and $0.0075 < Z < 0.015$, having a perovskite-type crystal structure and possessing a relatively high dielectric constant ($E_r$) greater than 200, a high unloaded dielectric Q at least greater than 1000, and a relatively low absolute value of a resonant frequency temperature coefficient ($T_f$) in the RF range. Due to the hysteritic nature of the non-linear region, the dielectric ceramic of the present invention was characterized on both heating and cooling. The data measurements and computations in Table 1 provide representative values of $T_f$ for the dielectric ceramic of the present invention:

TABLE 1

| |
|---|
| % Change in Frequency from −35° C. to +85° C. = +5.28 |
| Ave. $T_f$(ppm/°C.) = 440.3 |
| where Freq.$_{max}$ is 363.464 MHz at 85.0° C. on heating |
|     Freq.$_{min}$ is 344.677 MHz at −35.0° C. on cooling |
| % Change in Frequency from −35° C. to +65° C. = +3.65 |
| Ave. $T_f$(ppm/°C.) = 365.4 |
| where Freq.$_{max}$ is 357.671 MHz at 33.3° C. on heating |
|     Freq.$_{min}$ is 344.677 MHz at −35.0° C. on cooling |
| % Change in Frequency from −25° C. to +65° C. = +3.16 |
| Ave. $T_f$(ppm/°C.) = 352 |
| where Freq.$_{max}$ is 357.671 MHz at 33.3° C. on heating |
|     Freq.$_{min}$ is 346.417 MHz at −25.0° C. on cooling |

FIG. 1 sets forth computations and measurements for the dielectric constant ($E_r$), percent frequency shift, and incremental $T_f$ values for the dielectric ceramic of the present invention. It is seen from FIG. 1 that $E_r$ is greater than 200, and percent resonant frequency shifts are lower than 4.0%, corresponding to a $T_f$ value of 400 ppm/°C. Further measurements indicate Q values greater than 1000.

Figure 2:
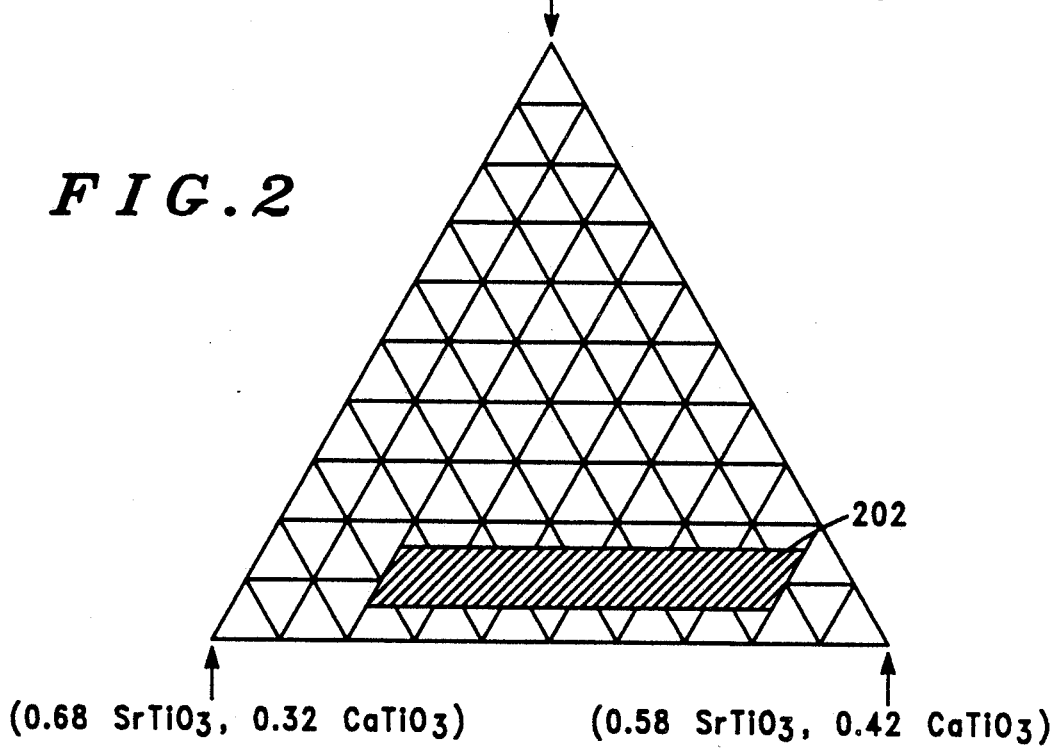
FIG. 2 is a ternary phase diagram substantially depicting a relative range of composition of components of the compound $(Sr_xCa_yMn_z)TiO_3$, the perovskite-type crystal dielectric ceramic set forth in the present invention.

FIG. 2 is a ternary phase diagram showing a relative range of composition (202) of components of the compound $(Sr_xCa_yMn_z)TiO_3$, the perovskite-type crystal dielectric ceramic set forth in the present invention. Addition of manganese causes the non-linear region of the dielectric properties to occur over a broader temperature range.

Table 2 illustrates the resonant frequency of the dielectric ceramic of the material, measured at selected temperatures:

TABLE 2

| Temperature (°C.) | Resonant Frequency On cooling (MHz) | Resonant Frequency On heating (MHz) |
|---|---|---|
| −35 | 344.68 | 344.64 |
| −25 | 346.42 | 346.42 |
| −10 | 349.24 | 349.27 |
| +25 | 355.57 | 356.76 |
| +50 | 350.42 | 351.65 |
| +65 | 355.84 | 355.82 |
| +85 | 363.46 | 363.60 |

Figure 3:
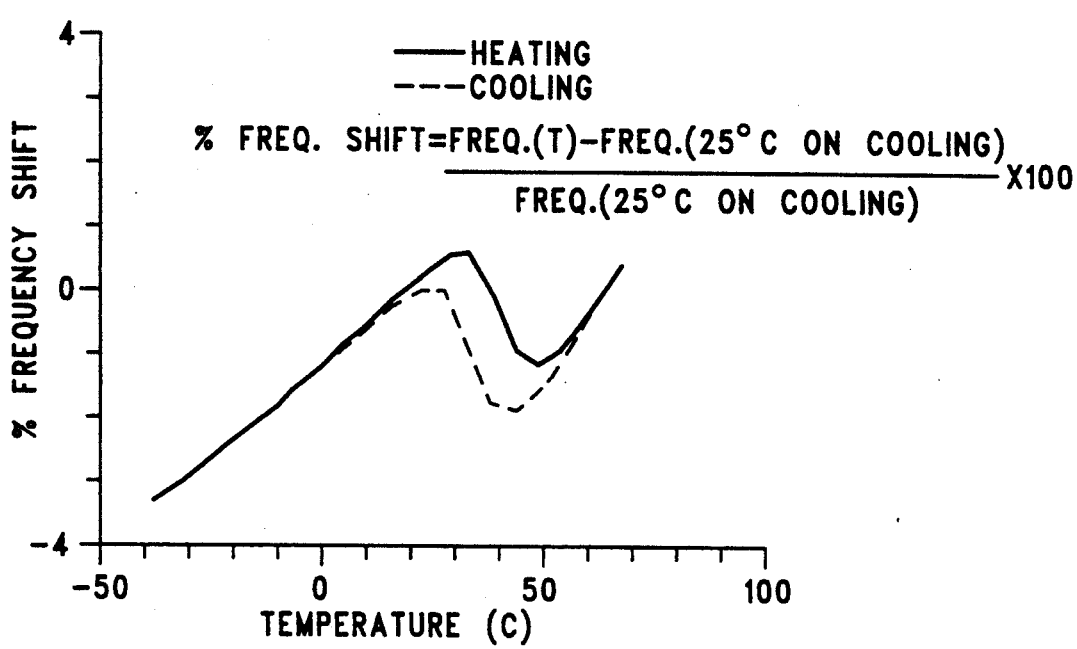
FIG. 3 is a graph showing representative changes in resonant frequency with respect to temperature in degrees Celsius for the dielectric ceramics of this invention.

FIG. 3 is a graph showing resonant frequency shift with respect to temperature in degrees Celsius for the dielectric ceramics of this invention. It can easily be determined that the ratio between the strontium, calcium, and magnesium will decide the temperature at which non-linearity of the resonant frequency versus temperature begins to occur.

The dielectric ceramics of the invention exhibit non-linear temperature coefficients with a significantly lower average $T_f$ than that of presently utilized dielectric ceramics with dielectric constants greater than 200, allowing incorporation of these ceramics in filters and resonators where low $T_f$ is required.

A method for preparing a perovskite-type crystal dielectric ceramic to selectively obtain a formulation consisting essentially of $(1-m)[(Sr_xCa_yMn_z)TiO_3]+m$ $CaTiSiO_5$ and having a relatively high dielectric constant together with a relatively low non-linear temperature coefficient, wherein x, y, z, and m satisfy the following relationships:

$0.98 < x+y+z < 1.02$, $0.34 < y < 0.4$, $0.0075 < z < 0.015$, and $0.005 < m < 0.015$ is initiated by preparing a mixed powder by combining proportions of a strontium compound such as $SrCO_3$ or $SrTiO_3$, a calcium compound such as $CaCO_3$ or $CaTiO_3$, a titanium-oxygen containing compound such as $TiO_2$ if insufficient amounts of titanate compounds are selected in the previous steps, and a manganese compound such as $MnCO_3$, $MnTiO_3$, or manganese nitrate, calculated to produce a compound consisting essentially of $(Sr_xCa_yMn_z)TiO_3$, wherein x, y, and z satisfy the following relationships: $0.98 < x+y+z < 1.02$, $0.34 < y < 0.4$, and $0.0075 < z < 0.015$, mixing the compounds, suitably pulverizing and calcining to obtain the $(Sr_xCa_yMn_z)TiO_3$ compound.

After calcination, the $(Sr_xCa_yMn_z)TiO_3$ is mixed with a suitable amount of a silicon-oxygen containing compound such as $CaTiSiO_5$, $CaSiO_3$, or $SiO_2$ to obtain a formulation (1-m) parts of $(Sr_xCa_yMn_z)TiO_3$ per m parts silicon-oxygen containing compound, wherein m is mole fraction, and such that x, y, z, and m satisfy the following relationships:

$0.98 < x+y+z < 1.02$, $0.34 < y < 0.4$, $0.0075 < Z < 0.015$, and $0.005 < m < 0.015$.

The particle size is reduced, and the material is compressed or tape cast as desired. The material is then sintered for two to eight hours in a temperature range of 1280° C. to 1400° C.

A working example below sets forth a preparation of the composition of the present invention and the method utilizing the invention more specifically:

EXAMPLE

Powders of strontium carbonate, calcium carbonate, titanium dioxide, and manganese titanate all having a purity of at least 99% by weight were used as raw materials. In repeated preparations, these raw material powders were weighed so as to give ceramics having each of the compositions shown by x, y, and z of the general formula $(Sr_xCa_yMn_z)TiO_3$, wherein $0.98 < x+y+z < 1.02$, $0.34 < y < 0.4$, and $0.0075 < z < 0.015$, were then dispersed in a suitable amount of demineralized water and mixed together for approximately four hours. The resulting mixture was dried at approximately 95° C. for four hours, pulverized to a screen size of less than 40 mesh, and calcined at 1100°–1200° C. for a period of at least 4 hours for a sample size of approximately 2 kg.

One mole percent of $CaTiSiO_5$ powder having a purity of at least 99% by weight, was combined with 99 mole percent of calcined powder, and the mixture was ball milled to a particle size of approximately one micron. The mixture was dried and pulverized, dry pressed at 10,000–15,000 psi, and sintered at 1280° C. to 1400° C. for four hours.

After the ball milling process, some preparations were combined with binder and plasticizers as is known in the art, and then tape cast and sintered as stated above to form a substrate.

The resultant material may be utilized as a dielectric without further treatment or may be metallized. The relatively low $T_f$, together with the relatively high $E_r$ and Q values, of the resultant dielectric ceramic provides a material particularly suitable for block filter, resonator, and stripline filter applications.

What is claimed is:

1. A dielectric ceramic consisting substantially of a solid solution titanate having a perovskite-type crystal structure, said titanate having the composition represented by the following general formula:

$(Sr_xCa_yMn_z)TiO_3$ wherein x, y, and z are numbers represented respectively by the expressions $0.98 < x+y+z < 1.02$, $0.34 < y < 0.4$, and $0.0075 < z < 0.015$.

2. The dielectric ceramic of claim 1, wherein the dielectric constant of the dielectric ceramic is greater than 200.

3. The dielectric ceramic of claim 1, wherein the dielectric Q of the dielectric ceramic is greater than 1000.

4. The dielectric ceramic of claim 1, wherein the average resonant frequency coefficient of the dielectric ceramic is less than 400 ppm/°C. for the temperature range of $-35°$ C. to $+65°$ C.

* * * * *